United States Patent [19]

Ek et al.

[11] Patent Number: 5,632,014

[45] Date of Patent: May 20, 1997

[54] METHOD AND ARRANGEMENT FOR TESTING SERVICES IN A TELECOMMUNICATIONS SYSTEM

[75] Inventors: Anders Ek, Malmö; Lennart Månsson, Hjärup, both of Sweden

[73] Assignee: Telia AB, Farsta, Sweden

[21] Appl. No.: 454,153

[22] PCT Filed: Nov. 10, 1993

[86] PCT No.: PCT/SE93/00952

§ 371 Date: Aug. 3, 1995

§ 102(e) Date: Aug. 3, 1995

[87] PCT Pub. No.: WO94/15429

PCT Pub. Date: Jul. 7, 1994

[30] Foreign Application Priority Data

Dec. 18, 1992 [SE] Sweden .................. 9203817

[51] Int. Cl.⁶ .................................................. G06F 11/00
[52] U.S. Cl. .................................................. 395/183.09
[58] Field of Search .................. 395/183.01, 183.09, 395/183.02, 183.04, 500; 379/1, 29, 34, 201, 207

[56] References Cited

U.S. PATENT DOCUMENTS

| | | | |
|---|---|---|---|
| 5,359,649 | 10/1994 | Rosu et al. | 379/220 |
| 5,394,540 | 2/1995 | Barrinton et al. | 395/500 |
| 5,410,586 | 4/1995 | Davies | 379/14 |
| 5,440,719 | 8/1995 | Hanes et al. | 395/500 |
| 5,450,480 | 9/1995 | Man et al. | 379/201 |
| 5,481,601 | 1/1996 | Nazif et al. | 379/207 |
| 5,511,116 | 4/1996 | Shastry et al. | 379/201 |

FOREIGN PATENT DOCUMENTS

WO9211603  9/1992  WIPO.
WO9211724  9/1992  WIPO.

OTHER PUBLICATIONS

Bosco, "An Intelligent Network Test Bed for Service Design, Validation and Execution", Proceddings, IEEE, Seminar on Digital Communications pp. 103–118 Mar. 1992.

*Primary Examiner*—Robert W. Beausoliel, Jr.
*Assistant Examiner*—Joseph E. Palys
*Attorney, Agent, or Firm*—Oblon, Spivak, McClelland, Maier & Neustadt, P.C.

[57] ABSTRACT

A method and an arrangement for trying out in advance prerequisites for introducing new services in a telecommunications system. A base system is described by a specification language, a new service is described by the specification language as separate supplement to the base system description. The base system description and supplement are linked together to form a description of the total resultant system. The total system is then analysed, for example by a reachability analysis. The invention also relates to an arrangement for carrying out the method. The invention solves the technical problem of identifying problems of an interservice interference type with respect to specific services at an earlier stage.

11 Claims, 1 Drawing Sheet

METHOD AND ARRANGEMENT FOR TESTING SERVICES IN A TELECOMMUNICATIONS SYSTEM

FIELD OF THE INVENTION

The present invention relates to a method and arrangement for trying out in advance prerequisites for introducing new services in a telecommunications system. When introducing new services, supplementary services, in a complex system, for example a telecommunications system, it is an advantage and in practice a necessity that, with the development of each new service, one only needs to take into consideration how the new service will function together with a basic part of the existing system (base system) or together with the base system and some service developed earlier and on which the new service is intended to build. Not to have to take into consideration supplementary services developed earlier and any services which are developed in parallel reduces the development so significantly that this can be considered to be the normal way of attacking the problem with supplementary services.

PRIOR ART

However, this method entails the risk that different supplementary services introduced interfere with one another in a manner which cannot be predicted in a design, so-called interservice interference, through combination effects between the different supplementary services.

A complete development is traditionally made to end when each service by itself is installed in the existing telecommunications system. It has been attempted to attack the problem of interservice interference by carrying out limited manual analyses, as a rule based on the designer's own earlier experiences. Alternatively, the interference problems have not been uncovered until the operation of the resulting system, which results in the work for correcting the problem being much harder.

Thus, the technical problem is to identify a problem of the type of interservice interferance at an earlier stage with respect to specific services and to understand the causal connection which causes it. This problem is solved by the present invention.

SUMMARY OF THE INVENTION

The present invention thus provides a method for testing services in a telecommunications system, a base system being described in a specification language, a new service being described in the specification language as separate supplement to the base system description and the base system description and the supplement being linked together to form a description of the total resultant system. The total system is then analysed, for example by reachability analysis.

The invention also relates to an arrangement for carrying out the method including a specification language generator which translates specifications of a base system and a new service to respective descriptions in a specification language, a linking element which links together the descriptions formed into a description of the total resultant system and analysis aids which analyse the total description.

Embodiments of the invention are specified in greater detail in the subsequent patent claims.

SHORT DESCRIPTION OF THE DRAWINGS

The invention will now be described in detail with reference to the following drawing, the only figure of which is a block diagram of the arrangement according to the invention.

DETAILED DESCRIPTION OF PREFERRED EMBODIMENTS

Figure 1:
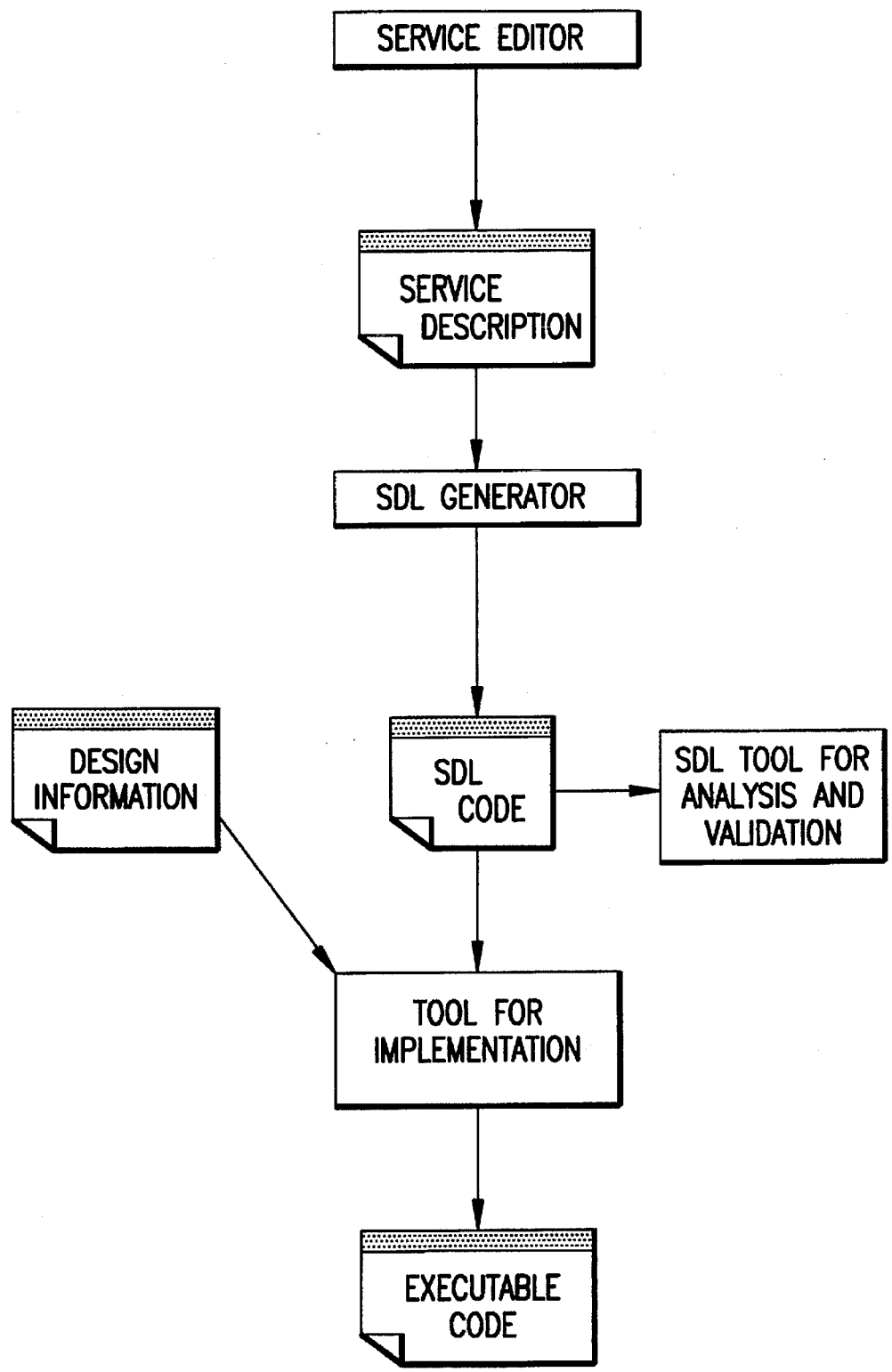

The invention builds on the fact that the telecommunications system in which the new services will be introduced, that is to say the base system, is described by a formal specification language. This is an established technique and there are a number of formal languages which are used for the purpose. The services which will be supplied are described by the same language as separate supplements to the base system description. The supplementary services can be analysed separately for verifying that they will function together with the base system in the intended way. The different services thus described can then be brought together to form a description of the total resultant system. The system can then be analysed by known analysis techniques, for example reachability analysis, in order to identify problems which could occur as a consequence of combination effects between supplementary services. The reachability analysis creates a model in the form of a tree with action/condition chains. The result of the analysis is a list of conditions which lead to malfunction situations. The list is an aid for finding problems with interservice interference.

The Figure describes a preferred embodiment of the invention. The designer uses a service editor for defining a new service in the system. There are graphic editors for interactive design of services. These provide the possibility to define a service in a user-friendly way, expressed in service descriptions which consist of modules or blocks (SIB, service independent building block). The CCITT definition of the modules is expressed as a translation from a service description containing modules into SDL (specification description language). Each module is defined with the aid of a translation to a fragment of a SDL process.

The specification language generator is a SDL code generator which takes a description and translates it into SDL in accordance with translation rules which are defined in the CCITT recommendations.

The SDL code formed is analysed by SDL analysis aids. There are mainly two aids which are of interest, simulators and dynamic analysers, for example the stimulator by SDT and SBA, a dynamic analyser. These tools provide the possibility of analysing both each description by itself and a description in combination with other descriptions. They carry out reachability analyses for analysing problems with interservice interference.

The invention can be supplemented by tools for implementation. These constitute a collection of tools which can be used, from a SDL specification and design information, to create one or more executable modules which can be loaded into a network component and run. The tools build on the use of a SDL/C translator together with text editors, compilers and so forth which are required for completing the code produced.

It is thought that the arrangement can be used by three different types of users:

Simple service designers using the service editor in combination with analysis aids which present a result at description level expressed in modules.

Advanced service designers using the service editor and all SDL aids which are accessible for analysis, simulation and so forth. It is typical of this type of user that he understands how translation into SDL functions in broad outline and that he can work at SDL level with different types of tools. This type of user presumably works for some telecommunications operator and is not only interested in the design of single services but also in the interaction between different services and between the services and the telecommunications network.

Service implementors using the SDL-related tools and the tools which are needed with implementational work. This is actually a normal software specialist who, starting from a SDL specification of a service, implements it with the most effective tools available to him.

Thus, the invention relates to a method and arrangement which solves the above problems. The scope of the invention is only limited by the patent claims below.

What is claimed is:

1. An arrangement configured to analyze services in a telecommunications system, comprising:
   a specification language generator which translates a base system specification and a new service specification into respective descriptions in a specification language;
   a linking element which links together the base system specification and the new service descriptions to form a system description of a total resultant system in the specification language; and
   a set of analysis aids which analyze the system description.

2. The arrangement according to claim 1, wherein the set of analysis aids comprise:
   analysis aids configured to analyze the base system description separate from then new system description.

3. The arrangement according to claim 1 wherein the set of analysis aids comprise:
   a simulator; and
   a dynamic analyzer.

4. The arrangement according to claim 1, further comprising;
   a graphics editor which describes the base system and the new service by respective predefined modules.

5. Arrangement according to claim 1, wherein in that the specification language generator is a SDL code generator.

6. Arrangement according to claim 2, wherein the analysis aids comprise simulators and dynamic analyzers.

7. The arrangement according to claim 2, further comprising:
   a graphics editor which describes the base system and the respective new service by predefined modules.

8. The arrangement according to claim 3, further comprising:
   a graphics editor which describes the base system and the new service by predefined modules.

9. The arrangement according to claim 2, wherein the specification language generator comprises a SDL code generator.

10. The arrangement according to claim 3, wherein the specification language generator comprises a SDL code generator.

11. The arrangement according to claim 4, wherein the specification language generator comprises a SDL code generator.

* * * * *